C. B. GUTHRIE.
CONSOLIDATED TARIFF INDEX.
APPLICATION FILED MAR. 30, 1912.

1,041,623.

Patented Oct. 15, 1912.

2 SHEETS—SHEET 1.

Fig. 1.

Item No. 2.

ISSUING CARRIERS

This Index contains a complete list of Freight Tariff publications issued by, or participated in, and applicable at, from, to or via the following lines:

| TRANSPORTATION CO. | F. X. 1, No. | TRANSPORTATION CO. | F. X. 1, No. |
|---|---|---|---|
| 2 | 3 | 2 | 3 |

Fig. 2.

Item No. 3.

LIST OF COMMODITIES.

Commodities are, as far as possible, indexed alphabetically according to the list named below, and "General Commodity" Tariffs will, when not in excess of 20 commodities, bear reference to the key which indicates that they carry Special Commodity ratings, as indicated by such reference.

| KEY | COMMODITY | KEY | COMMODITY |
|---|---|---|---|
| A | Agricultural Implements and Vehicles | Ja | Iron and Steel Articles |
| C | Canned Goods | Jb | Junk |
| Cb | Cement, Lime and Plaster | L | Leather, etc. |
| Cd | Chemicals and Drugs | La | Liquors, Waters and Wines |
| Ce | Cider, Vinegar and Pickles | Lb | Lumber and Forest Products |
| Cf | Clay and Clay Products | M | Machinery, Machines and Appliances |
| Cg | Brick | Ma | Electrical |
| Ch | Crockery | Mb | Steam |
| Ci | Earthenware | N | Naval Stores |

Fig. 3.

Item No. 4.    CARRIERS IN TRUNK LINE TERRITORY

| KEY | ABBREVIATION | NAME OF CARRIER | TARIFF ISSUING OFFICER OR TITLE | ADDRESS |
|---|---|---|---|---|
| A-1 | A. & St. L. | Adirondack & St. Lawrence R.R. | John Smith, Supt. | Hermon, N.Y. |
| A-2 | A. S. | Albany Southern R.R. | Richard C. Roe, Genl Frt. Agt. | Albany, N.Y. |
| A-3 | A. & E. | Alexander & Eastern Ry. | John Doe, Genl Mgr. | Alexander, W.Va. |
| A-4 | A. V. | Allegheny Valley Ry. | Charles K. James, Genl Frt Agt. | Philadelphia, Pa. |
| A-5 | A. & B.C. | Altoona & Beech Creek R.R. | Henry George, Prest. | Altoona, Pa. |
| A-6 | At. City | Atlantic City R.R. | Ralph J. May, Genl Frt. Agt. | Philadelphia, Pa. |
| A-7 | A. Q. & W. | Atlantic, Quebec & Western Ry. | Frank Ball, Supt. | New Castle, Que. |
| A-20 | B. & O. | Baltimore & Ohio R.R. | Frank T. Holley, Frt. Tariff Agt. | Baltimore, Md. |
| A-21 | B. & S.P. | Baltimore & Sparrows Point R.R. Co. | James H. Smith, Traffic Agt. | Sparrows Point, Md. |
| A-22 | B. C. & A. | Baltimore, Chesapeake & Atlantic Ry. | F. K. Jersen, Genl Frt Agt. | Baltimore, Md. |
| A-23 | B. S. P. Co. | Baltimore Steam Packet Co. | Chas. H. Jones, T. Mar. | Baltimore, Md. |

Witnesses:
Geo. R. Adsore
C. M. Badger

Inventor,
Charles B. Guthrie.
By Bakewell & Cornwall, Attys.

C. B. GUTHRIE.
CONSOLIDATED TARIFF INDEX.
APPLICATION FILED MAR. 30, 1912.

1,041,623.

Patented Oct. 15, 1912.

2 SHEETS—SHEET 2.

Fig. 4.

AGRICULTURAL IMPLEMENTS AND VEHICLES

AGRICULTURAL IMPLEMENTS

| NUMBERS | | ISSUED BY | | FROM | TO | PARTICIPATING CARRIERS. (see Item No. 4.) |
|---|---|---|---|---|---|---|
| Index No. | I.C.C. | OTHER COMS. | Road or Agent. | Issuing No. Effective | | | |
| | 1581 | | Cent. of Ga. | 63-C 9-19-09 | Eatonton, Hillsboro and Monticello, Ga. | Southeast Miss. Valley, Ohio and Miss. River Crossings | A-1, A-2, A-3 |

BUGGIES, CARRIAGES, WAGONS

| | A-1374 | | A.C.L | Wil. Veh. No. 3. 10-1-10 | Wilson......N.C. | Southeast Miss. Valley, Va. Cities, Carolinas, Del, Md....... | A20. L15,L17,19,20,21,22,23,24,25,26,29 L30,L31,32,33,34,35,37,40,41,44. L45,L50,55,57,59,70,71. M25,M27,29,30,40,41,42,45,47,50. M52,M57,58,65,67,69,70,71,72. N5,N7,10,15,20,25,27,28,29,30,31, N32,N33,34. O63,O64,65,66,67,68,69,70,71,72. O73,O74,75,76,77,78,79,80,81,82, O83,O84,85. |

CANE CARTS

| | Exp 203 | | Mo. Pac. | 402 11-24-07 | Memphis......Tenn. | Vera Cruz......Mex. | R10, R25, S20, T40 |

Fig. 5.

MISCELLANEOUS COMMODITY TARIFFS
Where not more than twenty Commodities are named, they will be as specified per Item No. 3.

| NUMBERS | | ISSUED BY | | APPLYING ON (see Item No. 3) | FROM | TO | PARTICIPATING CARRIERS (see Item No. 4.) |
|---|---|---|---|---|---|---|---|
| Index No. | I.C.C. | OTHER COMS | Road or Agent | Issuing No. Effective | | | | |
| | 2685 | | A. & V. V. S. & P. | 926-B 9-18-10 | A,C,Cb,Ce | Jackson......Miss Vicksburg......Miss | Alexandria......La. | A-7, A-4, A-1 |
| | A-1806 | | Mo. Pac. | 3959 8-31-'11 | Cg,Ch,Ci | Chicago, Milwaukee, Hannibal rate points | C. G. & Z. and St. L. I. M. & S. points in Illinois | A-20, -A-21 A-23 - A-1 |

Fig. 6.

LOUISIANA

| NUMBERS | | ISSUED BY | | APPLYING ON (see Item No. 3) | FROM | TO | PARTICIPATING CARRIERS (see Item No. 4.) |
|---|---|---|---|---|---|---|---|
| Index No. | I.C.C. | STATE COM'N | Road or Agent | Issuing No. Effective | | | | |
| | | | G.C. & S.F. | 9428-G 10-15-'11 | A, Cb | Alexandria and Lake Charles | G.C. & S.F. Ry. | R15, R20, 25, S10 |
| | 5866 | | T & G | 20 6-5-'09 | Class and Commodities | Alexandria, Monroe, Ruston, Sport, etc. | T & G. Stations | R |

Witnesses:
Geo. R. Cadson
O. M. Badger

Inventor,
Charles B. Guthrie
By Bakewell & Cornwell, Attys.

UNITED STATES PATENT OFFICE.

CHARLES B. GUTHRIE, OF ST. LOUIS, MISSOURI.

CONSOLIDATED TARIFF-INDEX.

1,041,623.      Specification of Letters Patent.      Patented Oct. 15, 1912.

Application filed March 30, 1912. Serial No. 687,481.

*To all whom it may concern:*

Be it known that I, CHARLES B. GUTHRIE, a citizen of the United States, residing at St. Louis, Missouri, have invented a certain new and useful Improvement in Consolidated Tariff-Indexes, of which the following is a full, clear, and exact description, such as will enable others skilled in the art to which it appertains to make and use the same.

This invention relates to tariff indices.

At the present time every railroad operating in the United States is required to publish an individual tariff index for the purpose of enabling their agents and the public to determine what tariffs are in effect and are applicable to shipments in a given territory. Whenever a transportation company makes a change by reissuing any of its tariffs, a supplement to the index announcing such change has to be issued every month, and every twelve months the entire index has to be revised and reissued.

As there are over thirteen hundred railroads operating in the United States, and each of these railroads is required to publish an individual tariff index, it will be seen that the annual expense to the railroads of publishing tariff indices amounts to hundreds of thousands of dollars. Furthermore, with the use of individual tariff indices each railroad has to keep on file the tariff indices of their participating carriers; or, in other words, of the various other railroads with which it coöperates and which participate in the tariffs referred to in the tariff index of the carrier issuing same. Frequent shippers also keep on file the tariff indices of the various railroads with which they do business, or which operate in the territory in which they are located in order to have complete information in regard to the tariffs that are in force on their commodities or particular territory. On account of the great expense, the individual tariff indices that are now in general use are often inaccurate owing to the fact that the railroads do not comply strictly with the requirements relating to revising and reissuing the tariff indices and publishing supplements, and they are generally confusing to the average shipper on account of the numerous repetitions that occur therein.

The main object of my invention is to provide a joint or consolidated tariff index that will show all of the tariffs in force on a number of railroads, if possible all of the railroads operating in the United States, said index to be issued by an agent acting under power of attorney from the various railroads or carriers, and thus overcoming the necessity of each railroad publishing an individual tariff index. I prefer to publish or print the index in sections, each of which relates to the railroads that operate in a certain section of the United States, for example, one section of the index would relate to western lines or western classification territory, another to official classification territory, another to southern classification territory, and another to transcontinental territory. This is only for convenience in filing and handling the index, however, and therefore I wish it to be understood that it is immaterial so far as my invention is concerned whether each issue of the index is published in one volume or in several volumes.

A joint or consolidated tariff index of the character above-described greatly reduces the expense now incurred by each railroad in publishing an individual tariff index, it reduces the space now required by the railroads and by the shippers for filing the individual tariff indices of the different railroads, it enables each railroad to comply strictly with the terms of the Interstate Commerce Commission relative to publishing supplements and reissuing tariff indices by reason of the fact that whenever a railroad makes a change in any of its tariffs it merely has to file a schedule showing such change with the Interstate Commerce Commission as at present, as the agent who issues the consolidated tariff index will maintain an office at Washington. When a railroad makes a change it will notify said agent instead of going to the expense of preparing and issuing a supplement or reissuing the entire tariff index as is now the general practice. It also enables a shipper to ascertain quickly where he can obtain a copy of the particular tariff in which he is interested by reason of the fact that the information in the consolidated tariff index is so condensed and arranged that any one of ordinary intelligence can understand same. The means used to designate the various lines or transportation companies is of such a character that it overcomes the necessity of providing one section to indicate the originating carriers and another section to indicate the delivering carriers. Furthermore, such an index shows clearly all of the lines participating under concurrence, and consequently makes it possible for concurring carriers to ascertain and check the concurrences, or authority to issue rates in connection with their lines.

Each section or volume of the consolidated tariff index contains the names of railroads or carriers that issue tariffs applicable to the territory which that particular volume or section of the consolidated index covers, and it also preferably contains the names and addresses of the tariff-issuing officers of said railroads so as to enable a shipper to ascertain the name and address of the person to whom he must write in order to obtain a copy of the published tariff in which he is interested. It also preferably contains the date upon which the tariffs became effective which is very valuable information to carriers and shippers in handling overcharge claims. The tariffs on commodities are preferably divided into specific or special commodity tariffs, miscellaneous commodity tariffs and general class and commodity tariffs.

In the section or portion of the volume that relates to special commodity tariffs a heading is provided for each special commodity, and under each of said headings is arranged the name of the railroad that issues the tariff on said special commodity and the points from and to which the tariff applies. All of the railroads or carriers which participate in said particular tariff are indicated in that section or portion of the index by means of symbols or characters that constitute a key, each symbol or character designating a certain railroad. The sections of the index that relate to miscellaneous commodity tariffs and general class and commodity tariffs are arranged in a similar manner, as hereinafter described. Any suitable key may be used for this purpose but I prefer to use one letter of the alphabet with a number or numbers added to designate each railroad, for example— the Adirondack & St. Lawrence Railroad would be designated by a symbol consisting of $A^1$, the Albany & Southern Railroad by a symbol consisting of $A^2$, and so on. Means is of course provided for explaining or defining the key, or, in other words, stating what railroad or carrier each symbol of the key represents, and in the preferred form of my invention as herein shown said means consists of a column provided with a heading entitled "Key" and arranged in that section or portion of the index that contains the names of the railroads or carriers, the names of the tariff-issuing officers, their addresses, etc., the key symbols being arranged in said column opposite the names of the railroads which they designate so that the person using the index can ascertain quickly and conveniently the key symbol that is used to designate a particular carrier. It is preferable to use certain groups of symbols to designate certain groups of railroads. For example, the railroads that operate in what is known as "trunk line territory" would be designated by the first five letters of the alphabet with appropriate numbers added; those that operate in what is known as "Central Freight Association territory" by the next five letters of the alphabet and appropriate numbers; those that operate in what is known as "southeastern territory" by the next five letters of the alphabet and appropriate numbers; those that operate in what is known as "southwestern territory" by the next five letters of the alphabet and appropriate numbers; and those that operate in what is known as "transcontinental territory" by the next five letters of the alphabet and appropriate numbers. In this way I am able to designate the lines in different sections of the country by groups of symbols which are similar or have such a relation to each other that a person using the index can tell from the symbols whether the symbol designates a trunk line, a transcontinental line, or so forth. That is to say, as soon as the user sees a symbol containing one of the groups of letters A, B, C, D or E he knows that the transportation company which said symbol designates is a trunk line.

In order to condense the index to a minimum I distinguish the key symbols that designate the originating carriers from the key symbols that designate the participating carriers by printing the originating carrier symbols in heavy or black-face type and the other symbols in light-face type in that portion or section of the index in which the information in regard to the various tariffs is contained. In this way I overcome the necessity of providing the index with one section pertaining to the originating carriers and a separate and distinct section pertaining to the participating carriers as is now the general practice. It is not essential, however, that the originating carriers or initial carriers and the other carriers be distinguished from each other in this particular manner as various means could be used for this purpose without departing from the spirit of my invention.

The lines that operate in two different territories, or publish tariffs applicable to two different territories, are designated by a different symbol for each territory. For example, if the Erie Railroad, which is known as a trunk line, operated in, or published a tariff applicable to the Central Freight Association territory, the symbol $C^1$ might be used to designate the Erie Railroad in connection with the tariffs applicable to trunk line territory, and the symbol G² might be used to designate the Erie Railroad in connection with tariffs applicable cable to Central Freight Association territory. This occurs in very few instances, however, or only where a line laps over or runs into different territory from that in which the line operates principally.

I also prefer to use a second key which is separate and distinct from the key just described for designating the various special commodities referred to in the index, said second key being preferably composed of symbols consisting of the letters of the alphabet; for example, agricultural implements and vehicles would be designated by the letter "A"; canned goods by the letter "C"; cement, lime and plaster by the letters "C$^b$", chemicals and drugs by the symbol "C$^a$" etc. The symbols comprising this second key are arranged in a column provided with a heading entitled "Key" opposite the names of articles which the symbols designate so as to define or explain the key, and in certain sections of the index these symbols are used in conjunction with the information relating to the tariffs so as to show the particular kind of goods on which the tariffs apply. Each section or volume of the consolidated index of course contains instructions relating to the use of the index and also descriptions or definitions of the keys as above described so as to show the symbol that is used to designate each railroad and the symbol that is used to designate each special commodity referred to in the index.

I have not herein illustrated the entire consolidated index but only such pages or portions of one section or volume of the index that are necessary to show the features which I claim are novel and which make it practicable to consolidate the information in the numerous individual indices now in use into one joint or consolidated index.

Figure 1 of the drawings shows one page of one volume or section of the index which contains the names of railroads or carriers that publish tariffs and operate in the particular section of the United States to which said section or volume relates; Fig. 2 shows a portion of another page which contains the names of special commodities and the key composed of symbols that designate the different special commodities; Fig. 3 shows a portion of another page which contains the names and addresses of the tariff-issuing officers of the railroads and also the key composed of symbols that designate the different railroads; Fig. 4 shows a portion of a page that contains information which shows what railroads issue tariffs on special commodities the points from and to which said tariffs apply; and the carriers or railroads that participate in said tariffs; the originating carriers being preferably indicated by heavy or black-face type and the intermediate or delivering carriers by light-face type; Fig. 5 shows a portion of a page that relates to miscellaneous commodity tariffs, and shows what railroads issue tariffs on miscellaneous commodities, the points from and to which said tariffs apply, and the carriers that participate in the tariffs; and Fig. 6 shows a portion of a page that relates only to State tariffs, namely, tariffs that apply only to points within a State.

Referring to Fig. 1 of the drawings which illustrates one page of the index, the reference character 1 designates a heading preferably consisting of the words "Issuing carriers" which is arranged above a plurality of vertical columns 2 and 3, the column 2 having a sub-heading 2$^a$ consisting of the word "Transportation company", and the column 3 having a subheading 3$^a$ consisting of the letters "F. X. I., No." In the column 2 are arranged the names of different railroads which operate in the section of the United States to which this particular volume of the consolidated index relates, and in the column 3 are arranged numbers which designate the carriers who have conferred power of attorney to the issuing agent under form F. X. I. as prescribed by the Interstate Commerce Commission. Preferably, the term "Item No. 2" is printed at the top of the page for convenience in referring to this section of the index.

The page illustrated in Fig. 2 has a heading 4 which preferably consists of the words "List of commodities", and under said heading are arranged a plurality of vertical columns 5 and 6, the column 5 having a sub-heading 5$^a$ consisting of the word "Key" and the column 6 having a sub-heading 5$^a$ consisting of the word "Commodity." In column 6 are arranged the names of various special commodities such, for example, as agricultural implements, canned goods, and cement, lime and plaster; and in the column 5 symbols constituting a key are arranged opposite the names of the special commodities in column 6 so as to show the key symbol that is used to designate each specific commodity. I have herein used the letter A to designate agricultural implements, and vehicles, the letter C to designate canned goods, and the letters C$^b$ to designate cement, lime and plaster, but I do not wish it to be understood that my invention is limited to an index provided with a "key" consisting of these particular symbols or characters for various other symbols or devices could be used to designate the special commodities referred to in the index without departing from the spirit of my invention.

The page illustrated in Fig. 3 has a heading 7 preferably consisting of the words "Carriers in trunk line territory" and the term "Item No. 4" or some other suitable term is preferably printed at the top of the page for the convenience of the user in finding this particular section of the index. Another page or pages, not shown, has a heading entitled "Carriers in C. F. A. territory." Another page or pages, not shown, has a heading consisting of the words "Carriers in southeastern territory", and so on, suitable headings being provided for the carriers in the southeastern, southwestern and transcontinental territories and all of said pages being grouped together so as to form the section or portion of the index that I have arbitrarily called "Item No. 4." Five vertical columns, designated by the reference characters 8, 9, 10, 11 and 12, are arranged under the heading 7, and each of said vertical columns has a sub-heading, the column 8 having a sub-heading 8ª consisting of the word "Key", the column 9 a sub-heading 9ª consisting of the word "Abbreviation", the column 10 a sub-heading 10ª consisting of the words "Name of carrier", the column 11 a sub-heading 11ª consisting of the words "Tariff-issuing officer or title", and the column 12 a sub-heading 12ª consisting of the word "Address." The names of the railroads or carriers that operate in the territory to which the above heading 7 relates are arranged in column 10, the names of the officers of said railroads which issue tariffs, are arranged in the column 11, and the addresses of said officers are arranged in the column 12. The column 9 contains abbreviations for the names of the railroads, and the column 8 contains the symbols or characters that form the "key" used to designate the different railroads the abbreviations and key symbols, of course, being arranged directly opposite or on the same line with the name of the railroad which they designate.

The page illustrated in Fig. 4 has a general heading 13, such, for example, as the words Agricultural implements and vehicles, and under this general heading is classified the names of the special commodities that come under said general heading. For example, a sub-heading 13ª is provided for agricultural implements; a sub-heading 13ᵇ is provided for buggies, carriages and wagons, a sub-heading 13ᶜ is provided for cane carts, and so on. Each of the sub-headings 13ª, 13ᵇ and 13ᶜ just referred to is grouped with or arranged over a plurality of vertical columns 14, 15, 16, 17, 18, 19, 20 and 21 arranged side by side and extending across the page, as shown in Fig. 4. The three columns 14, 15 and 16 to the left have a heading 140 consisting of the word "Numbers"; the next columns 17 and 18 have a heading 170 consisting of the words "Issued by"; the column 19 has a heading 190 consisting of the word "From"; the column 20 has a heading 120 consisting of the word "To"; and the column 21 has a heading 121 consisting of the words "Participating carriers."

In addition to the headings just referred to the columns 14, 15, 16, 17 and 18 have sub-headings 14ª, 15ª, 16ª, 17ª and 18ª, respectively, the heading 14ª consisting of the words "Index No."; the heading 15ª consisting of the letters "I. C. C."; the heading 16ª consisting of the words "Other commissions"; the heading 17ª consisting of the words "Road or agent"; and the heading 18ª consisting of the words "Issuing number effective." In the column 17 is arranged the name of the railroad that issues a tariff on agricultural implements; for example, the Central of Georgia; in the column 19 is arranged the name of the place or places from which this tariff applies, in the column 18 is arranged the issuing railroad's number and the date the tariff became effective, and in the column 20 the name of the place or places to which the tariff extends; the column 15 contains the Interstate Commerce Commission number of that particular tariff; the column 14 contains the index number of that particular tariff, (this to be used for convenience of the numeral section), and the column 16 contains any other commission number which has to be specified, for example, the Canadian, or the number of a State commission or commissions. All of the different carriers or railroads which participate in that particular tariff issued by the Central of Georgia are indicated in the column 21 by the key symbols that designate said carriers or railroads. If a number of transportation companies participate in that particular tariff, each company would be designated by its proper key symbol in column 21. Preferably, black-face symbols are used to designate originating carriers and light-face symbols to designate intermediate and delivering carriers. The words (see Item No. 4) are preferably printed in the heading 121 of column 21 so as to form a cross reference or connecting link between the key defined in columns 8, 9 and 10 of the section illustrated in Fig. 3 and the column of the section illustrated in Fig. 4 in which the participating carriers in certain tariffs are designated. For example, a person in looking up the tariff on agricultural implements from Eatonton, Ga. to southeast Mississippi Valley points would find the key symbols $A^1$, $A^2$ and $A^3$ in column 21 of the section or portion of the index illustrated in Fig. 4 of the drawings. He would then refer to the section of the index that I have termed "Item No. 4" and which is illustrated in Fig. 3 of the drawings, and upon examining columns 8 and 10 would find that the key symbol $A^1$ designates the Adirondack & St. Lawrence R. R.; that $A^2$ designates the Albany, Southern R. R.; and that $A^3$ designates the Alexander & Eastern Ry., thus ascertaining the fact that these three railroads participate in the tariff on agricultural implements from Eatonton, Ga. to southeast Mississippi Valley points. He would also know that the Adirondack & St. Lawrence R. R. was the originating carrier or initial carrier because the key symbol $A^1$ that designates said railroad is printed in black or heavy-face type. I have used the key symbols $A^1$, $A^2$ and $A^3$ in the example above given merely for the purpose of more clearly explaining my index and because these symbols are shown in Fig. 3 of the drawings, but in the actual index the key symbols of the railroads which do actually participate in the tariff mentioned in the example would be specified in column 21 of the section illustrated in Fig. 4.

From the above it will be seen that a consolidated tariff index of the construction above-described enables the carriers, shippers and all who may contemplate the use of that tariff to quickly determine its scope, and whether or not it would be applicable via the route or reach the territory of the desired shipment. In other words, the tariff is as completely described as far as it is practicable in a directory.

The page illustrated in Fig. 5 has a general heading 22 consisting of the words "Miscellaneous commodity tariffs", and under this general heading are arranged columns 14, 15, 16, 17, 18, 19, 20 and 21 like those shown in Fig. 4, and each having the same kind of a heading previously described in connection with Fig. 4. In addition to the vertical columns just mentioned the page illustrated in Fig. 5 is provided with an additional column 23 that has a heading $23^a$ consisting of the words "Applying on" and also the words "(See Item No. 3)." Said column 23 contains key symbols which designate certain commodities specified in the section of the index illustrated in Fig. 2 and termed "Item No. 3." For example, the key symbols A, C, $C^b$ and $C^e$ are arranged in column 23 of Fig. 5. By referring to column 5 of the section termed "Item No. 3" the user will see that the key symbol A designates agricultural implements and vehicles, that C designates canned goods, that $C^b$ designates cement, lime and plaster, and that $C^e$ designates cider, vinegar and pickles, and he will thus know that the particular tariff with which these key symbols are associated applies on the articles or the goods previously mentioned.

I have not illustrated the section of the index that relates to general class and commodity tariffs because it is a duplicate of the miscellaneous commodity tariff section illustrated in Fig. 5 except that the column 23 containing the commodity key symbols is not used, owing to the fact that this section relates to general class and commodity tariffs.

The page illustrated in Fig. 6 relates to class and commodity tariffs that are effective between certain points in a State and is provided with columns and headings of the same character as those illustrated in Fig. 5, the only difference between these two pages being that the page illustrated in Fig. 6 has a heading 24 consisting of the name of the State in which State tariffs as distinguished from interstate tariffs are effective.

If a person who contemplates shipping agricultural implements from Eatonton, Ga., to some point in the southeast Mississippi Valley desires to know what the tariff is on such articles he first examines the section of the consolidated index that relates to specific commodities, one page of which is illustrated in Fig. 4. The specific commodities are listed alphabetically in this section so that the user quickly finds the tariff in which he is interested. By referring to columns 17 and 18 of said section (illustrated in Fig. 4) he finds that the tariff is issued by the Central of Georgia Railroad and that it became effective on Sept. 19, 1909. If he desires to know the originating carrier and the various other carriers that participate in said tariff he reads across the page to column 21 in which he finds the key symbols $A^1$, $A^2$ and $A^3$. The cross reference (see Item No. 4) in the heading of column 21 informs the user that he must consult the section of the index termed "Item No. 4" which is illustrated in Fig. 3, in order to ascertain the names of the carriers which said key symbols designate. Turning to this section and examining columns 8 and 9, see Fig. 3 of the drawings, he quickly ascertains the names of the carriers that participate in the tariff in which he is interested. If he desires to obtain a copy of the tariff he consults columns 11 and 12 of the section termed "Item No. 4" so as to ascertain the name and address of the tariff-issuing officer of the railroad that issues the tariff, namely, the Central of Georgia.

In case a user fails to find the tariff in which he is interested in the section that relates to specific commodities, namely, the section illustrated in Fig. 4 of the drawings, he next refers to the section illustrated in Fig. 5 which relates to miscellaneous commodity tariffs. Suppose for example, the same goods above-mentioned are to be shipped but they are to be shipped from Jackson Miss. to Alexandria, La. In the miscellaneous commodity tariff section illustrated in Fig. 5 the user finds that there is a tariff between the points just mentioned and that it applies on A, C, C$^d$ and C$^e$, see column 23 of Fig. 5. In order to find out whether or not one of these symbols designates agricultural implements and vehicles, the user follows the instruction (see Item No. 3) in the heading of the column 23 and turns to the section illustrated in Fig. 2, thus finding in columns 5 and 6 of Fig. 2 that the key symbol A designates the goods which he desires to ship. If the user fails to find the tariff in which he is interested in either the specific commodity tariff section or the miscellaneous commodity tariff section he knows that "class" rates will apply, and by referring to the general class and commodity tariff section (not illustrated in the drawings) he will find the tariff in which he is interested. Should a rate be desired which contemplates a movement wholly within a single State, the user examines the section of the index that relates to State tariffs, one page of which is illustrated in Fig. 6.

Having thus described my invention, what I claim as new and desire to secure by Letters Patent is:

1. A consolidated tariff index comprising groups of leaves, the leaves of some of said groups being provided with means that show the tariffs that are issued by a number of transportation companies and the points from and to which said tariffs apply, a key composed of symbols grouped with said means for showing the originating and participating carriers that participate in said various tariffs, and means on the leaves of another group for explaining said key or defining what each symbol of the key designates.

2. A consolidated tariff index comprising groups of leaves, means on the leaves of some of said groups that show the tariffs that are issued by a number of transportation companies, a key composed of symbols grouped with said means for showing the carriers that participate in said various tariffs, and means on the leaves of another group for explaining said key or defining what each symbol of the key designates, there being a symbol for each carrier and the symbols which designate the carriers in one section of the country or which are known under a general name being related or distinguished from the symbols that designate the carriers in a different section of the country.

3. A consolidated tariff index comprising groups of leaves, the leaves of some of said groups being provided with means that show the tariffs that are issued by a number of transportation companies, a key composed of symbols grouped with said means for showing the originating carriers and participating carriers that participate in said various tariffs, and means on the leaves of another group for explaining said key or defining what each symbol of the key designates, the symbols that designate the originating carriers being distinguished from the symbols that designate the participating carriers in some suitable manner.

4. A consolidated tariff index comprising groups of leaves, the leaves of some of said groups being provided with means that show the tariffs that are issued by a number of transportation companies, a key composed of symbols grouped with said means for showing the carriers that participate in said various tariffs, means for explaining said key or defining what each symbol of the key designates, a second key separate and distinct from the first and composed of symbols that are grouped with the means first mentioned for designating certain commodities to which said tariffs apply, and means for explaining or defining the meaning of the symbols that compose said second key.

5. A consolidated tariff index comprising groups of leaves that form separate sections which relate to various kinds of commodity tariffs, means in each of said sections for showing the carriers that issue the tariffs specified in the section and the points from and to which particular tariffs apply, key symbols in each of said sections for indicating the carriers that participate in the tariffs specified therein, means for showing the dates on which the tariffs became effective, and means for defining or explaining said key, said explanatory means consisting of the names of the carriers and key symbols identical with the key symbols used in said sections arranged adjacent said names.

6. A consolidated tariff index comprising groups of leaves arranged to form separate sections which relate to various kinds of commodity tariffs, each of said tariff sections being provided with key symbols that are arranged to show the carriers that participate in certain tariffs, a separate section in which is arranged the names of the carriers, the names and addresses of the tariff issuing officers, and key symbols like those that are used in the tariff sections to designate certain of said carriers, and a cross reference in the tariff sections of the index for showing the co-relation between the key symbols therein and the key symbols in the section that contains the names of the carriers.

In testimony whereof I hereunto affix my signature in the presence of two witnesses, this twenty sixth day of March 1912

CHARLES B. GUTHRIE.

Witnesses:
  WELLS L. CHURCH,
  GEORGE BAKEWELL.